United States Patent
Mizukoshi et al.

(10) Patent No.: US 10,752,112 B2
(45) Date of Patent: Aug. 25, 2020

(54) METER DISPLAY DEVICE

(71) Applicant: HONDA MOTOR CO., LTD., Minato-Ku, Tokyo (JP)

(72) Inventors: Takeo Mizukoshi, Wako (JP); Naoaki Kunisada, Wako (JP); Hayato Kawakami, Wako (JP); Hiroki Ue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/223,488

(22) Filed: Dec. 18, 2018

(65) Prior Publication Data

US 2019/0184829 A1 Jun. 20, 2019

(30) Foreign Application Priority Data

Dec. 20, 2017 (JP) ................. 2017-244031

(51) Int. Cl.
*B60K 35/00* (2006.01)
*G09G 3/34* (2006.01)
*G09G 3/36* (2006.01)
*B60Q 9/00* (2006.01)

(52) U.S. Cl.
CPC ........... *B60K 35/00* (2013.01); *B60Q 9/00* (2013.01); *G09G 3/3406* (2013.01); *G09G 3/3607* (2013.01); *B60K 2370/188* (2019.05); *B60K 2370/34* (2019.05); *B60K 2370/349* (2019.05); *G09G 2320/0626* (2013.01); *G09G 2320/0666* (2013.01); *G09G 2360/144* (2013.01); *G09G 2380/10* (2013.01)

(58) Field of Classification Search
CPC ........ B60K 2370/349; B60K 2370/188; G09G 2360/144; G09G 2380/10
See application file for complete search history.

(56) References Cited

U.S. PATENT DOCUMENTS

| | | | |
|---|---|---|---|
| 8,274,459 B2 | 9/2012 | Kato et al. | |
| 2007/0078598 A1* | 4/2007 | Watanabe | B60K 37/02 701/429 |
| 2010/0033311 A1 | 2/2010 | Tominaga | |
| 2016/0187651 A1* | 6/2016 | Border | G02B 27/0172 345/8 |
| 2018/0364871 A1* | 12/2018 | Bostick | G06N 5/02 |

FOREIGN PATENT DOCUMENTS

| | | |
|---|---|---|
| JP | 04-035939 U | 3/1992 |
| JP | H09-301065 A | 11/1997 |
| JP | 2007-091030 A | 4/2007 |
| JP | 2009-166839 A | 7/2009 |
| JP | 2010-060553 A | 3/2010 |

OTHER PUBLICATIONS

Office Action dated May 28, 2019 issued over the corresponding Japanese Patent Application No. 2017-244031 A with the English translation thereof.

* cited by examiner

*Primary Examiner* — Grace Q Li
(74) *Attorney, Agent, or Firm* — Carrier Blackman & Associates, P.C.; Joseph P. Carrier; William D. Blackman

(57) ABSTRACT

A meter ECU changes a display color of a meter display item without changing a luminance of a first backlight of a first display and a display color of a first lamp display item, between when an illuminance detected by an optical sensor is higher than a certain threshold value (step S2, step S3) and when the illuminance is lower than the certain threshold value (step S7, step S8).

2 Claims, 4 Drawing Sheets

METER DISPLAY DEVICE

CROSS-REFERENCE TO RELATED APPLICATION

This application is based upon and claims the benefit of priority from Japanese Patent Application No. 2017-244031 filed on Dec. 20, 2017, the contents of which are incorporated herein by reference.

BACKGROUND OF THE INVENTION

Field of the Invention

The present invention relates to a meter display device including: a liquid crystal display that displays a meter display item and a lamp display item such as a warning light; and an ECU that controls the liquid crystal display.

Description of the Related Art

Japanese Laid-Open Utility Model Publication No. 04-035939 shows a meter display device of a vehicle configured by a fluorescent display tube, an LED, a liquid crystal display, or the like. This meter display device is configured so as to detect by an optical sensor an illuminance of a periphery of the vehicle and control a luminance of a backlight according to the illuminance.

SUMMARY OF THE INVENTION

When a luminance of a display item displayed in a display section is set the same between nighttime and daytime, an occupant feels dazzled at nighttime. Therefore, at nighttime, the luminance of the display item is preferably set low, as in the meter display device of Japanese Laid-Open Utility Model Publication No. 4-035939.

Incidentally, there are meter display devices in which the display section of the meter display device is configured as a liquid crystal display, and a meter display item indicating a meter and a lamp display item indicating a lamp such as a warning light or display light, are displayed within the same display section. If, in this kind of meter display device, the luminance is uniformly lowered in order to suppress dazzling due to the display item at nighttime, and so on, then a part of the display item, for example, a lamp display item whose display color is red, becomes difficult to see.

The present invention was made in view of such a problem, and has an object of providing a meter display device in which each of display items can be made easy to see while dazzling is suppressed, even when an illuminance of an outside or an interior of a vehicle is low.

A first invention is
a meter display device including:
a display that utilizes a liquid crystal to display a meter display item and a lamp display item, the meter display item indicating a meter of a vehicle, and the lamp display item indicating by a displayed state or a non-displayed state a state of the vehicle; and
a meter ECU that controls the display,
the meter display device further including an optical sensor that detects an illuminance of an outside or an interior of the vehicle, and
the meter ECU changing a display color of the meter display item without changing a luminance of a backlight of the display and a display color of the lamp display item, between when the illuminance is higher than a certain threshold value and when the illuminance is lower than the certain threshold value.

In the above-described configuration, the luminance of the backlight of the display is not changed, regardless of the illuminance of the outside or the interior of the vehicle. Therefore, a luminance required to visually recognize the lamp display item is always maintained. Hence, the lamp display item can be made easy to see. On the other hand, in the above-described configuration, the display color of the meter display item is changed according to the illuminance. At this time, it is possible to set to a display color that enables dazzling to be suppressed. Thus, due to the above-described configuration, each of the display items can be made easy to see while dazzling is suppressed, even when the illuminance of the outside or the interior of the vehicle is low.

The first invention may be configured such that
the meter ECU increases a pixel value of the meter display item when the illuminance is higher than a certain threshold value, and reduces the pixel value of the meter display item when the illuminance is lower than the certain threshold value.

Due to the above-described configuration, the pixel value of the meter display item is reduced when the illuminance is low, hence dazzling can be suppressed.

The first invention may be configured such that
the lamp display item is a warning light that indicates by a displayed state an abnormality of the vehicle, and
the meter ECU,
in the case where an abnormality is occurring in the vehicle, changes the display color of the meter display item without changing the luminance of the backlight and a display color of the warning light, between when the illuminance is higher than a certain threshold value and when the illuminance is lower than the certain threshold value, and
in the case where an abnormality is not occurring in the vehicle, changes the luminance of the backlight without changing the display color of the meter display item, between when the illuminance is higher than a certain threshold value and when the illuminance is lower than the certain threshold value.

Due to the above-described configuration, when an abnormality is not occurring, the luminance of the backlight can be lowered. Therefore, a consumed amount of electric power can be reduced.

The first invention may be configured such that
the meter ECU sets the display color of the warning light to red.

Due to the above-described configuration, the display color of the warning light is set to red, hence a warning can be emphasized.

The first invention may be configured such that
the meter ECU,
in the case where an abnormality occurs in the vehicle and the illuminance is higher than a certain threshold value, sets the display color of the meter display item to white, and
in the case where an abnormality occurs in the vehicle and the illuminance is lower than the certain threshold value, sets the display color of the meter display item to gray.

Due to the above-described configuration, when the illuminance is high, the meter display item can be made easy to see by setting the display color of the meter display item to white. Moreover, when the illuminance is low, dazzling due to the meter display item can be suppressed by setting the display color of the meter display item to gray.

A second invention is
a meter display device including:
a first display that utilizes a liquid crystal to display a meter display item and a first lamp display item, the meter display item indicating a meter of a vehicle, and the first lamp display item indicating by a displayed state or a non-displayed state a state of the vehicle;
a second display that displays a second lamp display item, the second lamp display item indicating by a displayed state or a non-displayed state a state of the vehicle that differs from the state of the vehicle indicated by the first lamp display item; and
a meter ECU that controls the first display and the second display,
the meter display device further including an optical sensor that detects an illuminance of an outside or an interior of the vehicle,
the first display being capable of switching a luminance of a backlight between a high luminance and a low luminance, and being capable of displaying the meter display item in a first display color or in a second display color a luminance level of which is smaller than that of the first display color, and
the meter ECU,
in the case where the illuminance is lower than a certain threshold value and in the case where the first lamp display item is set to the displayed state, sets the luminance of the backlight to the high luminance and sets the meter display item to the second display color, and
in the case where the illuminance is lower than the certain threshold value and in the case where the first lamp display item is set to the non-displayed state, sets the luminance of the backlight to the low luminance.

In the above-described configuration, when the first lamp display item is set to the displayed state, the backlight of the first display is set to the high luminance. Therefore, a luminance required to visually recognize the first lamp display item is always maintained. Hence, the first lamp display item can be made easy to see. On the other hand, in the above-described configuration, when the illuminance is low and the first lamp display item is set to a turned-off state, the luminance level of the display color of the meter display item is reduced. Therefore, dazzling can be suppressed. Thus, due to the above-described configuration, each of the display items can be made easy to see while dazzling is suppressed, even when the illuminance of the outside or the interior of the vehicle is low.

The second invention may be configured such that
the meter ECU,
when setting the luminance of the backlight to the low luminance and setting the first lamp display item and the second lamp display item to the displayed state, adjusts the luminance of the backlight such that a luminance of the first lamp display item will be the same as a luminance of the second lamp display item.

Due to the above-described configuration, a consumed amount of electric power can be further reduced.

Due to the present invention, each of the display items can be made easy to see while dazzling is suppressed, even when the illuminance of the outside or the interior of the vehicle is low.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a meter display device according to the present invention will be presented and described in detail below with reference to the accompanying drawings.

1. Configuration

Figure 1:
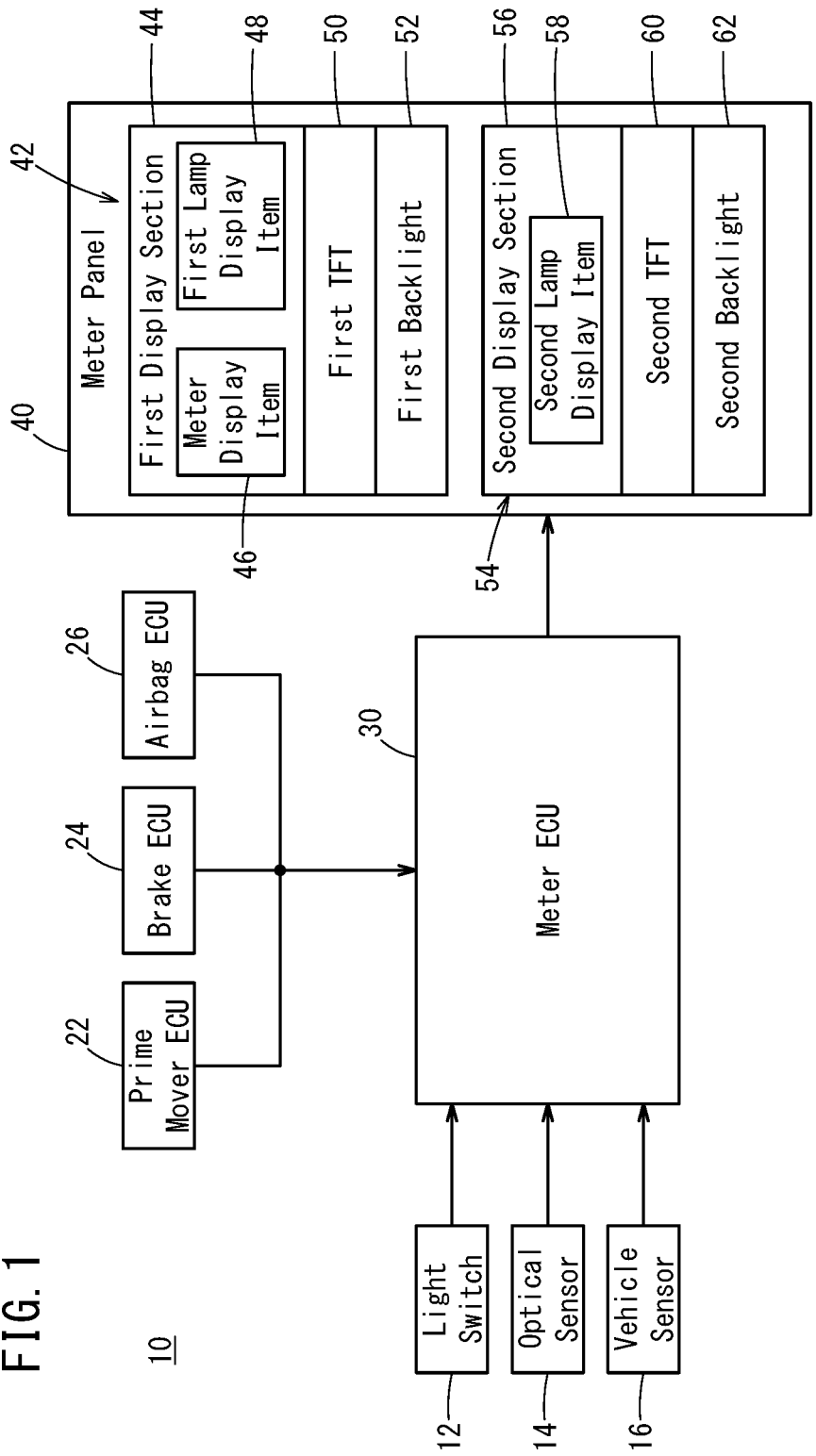
FIG. 1 is a configuration diagram of a meter display device according to the present embodiment.

As shown in FIG. 1, a meter display device 10 includes: a light switch 12, an optical sensor 14, a vehicle sensor 16, a prime mover ECU 22, a brake ECU 24, and an airbag ECU 26 as input devices; a meter ECU 30 as a control device; and a meter panel 40 as an output device. Each of the input devices and the meter ECU 30 are connected by a communication line, and the meter ECU 30 and the meter panel 40 are connected by a communication line.

The light switch 12 is a switch for switching 'lights-on' and 'lights-off' of a head lamp and a tail lamp of a vehicle according to a switching operation of an occupant, and outputs to the meter ECU 30 a switching signal that accords with the switching operation. The optical sensor 14 is provided on an outside or an interior of the vehicle, and detects an illuminance of the outside or the interior of the vehicle to be outputted to the meter ECU 30. The vehicle sensor 16 is a sensor group that detects various kinds of states of the vehicle. The vehicle sensor 16 includes the likes of a vehicle speed sensor, a prime mover revolution sensor, a fuel sensor, and a shift range sensor, for example. The vehicle sensor 16 outputs a detection signal to the meter ECU 30.

The prime mover ECU 22 includes: a computing device such as a processor; and a storage device such as a ROM or RAM. The prime mover ECU 22 achieves various kinds of functions by the computing device executing a program stored in the storage device. Each of the ECUs described below are also configured in the same way. The prime mover ECU 22 configures a prime mover control system along with the likes of a prime mover such as an engine or a drive motor. The brake ECU 24 configures a brake control system along with a brake actuator, and so on. The airbag ECU 26 configures an airbag system along with the likes of an airbag or a gas generating device. In the present embodiment, the prime mover ECU 22, the brake ECU 24, and the airbag ECU 26 monitor their respective systems, and when an abnormality occurs, output an abnormality occurrence signal to the meter ECU 30.

The meter ECU 30 receives each of the signals outputted from the input devices, performs a later-mentioned processing based on each of the signals, and outputs a display signal to the meter panel 40.

The meter panel 40 includes a first display 42 and a second display 54 that operate according to the display signal outputted from the meter ECU 30. The first display 42 is a liquid crystal display, and includes: a first display section 44 that displays a meter display item 46 and a first lamp display item 48; a first TFT 50 provided to each sub-pixel; and a first backlight 52. The first display 42 includes, in addition, the likes of a color filter, a polarizing plate, a liquid crystal, and an electrode that are not illustrated. The second display 54 is also a liquid crystal display, and includes: a second display section 56 that displays a second lamp display item 58; a second TFT 60; and a second backlight 62. The second display 54 includes, in addition, the likes of a color filter, a polarizing plate, a liquid crystal, and an electrode that are not illustrated.

Figure 2:
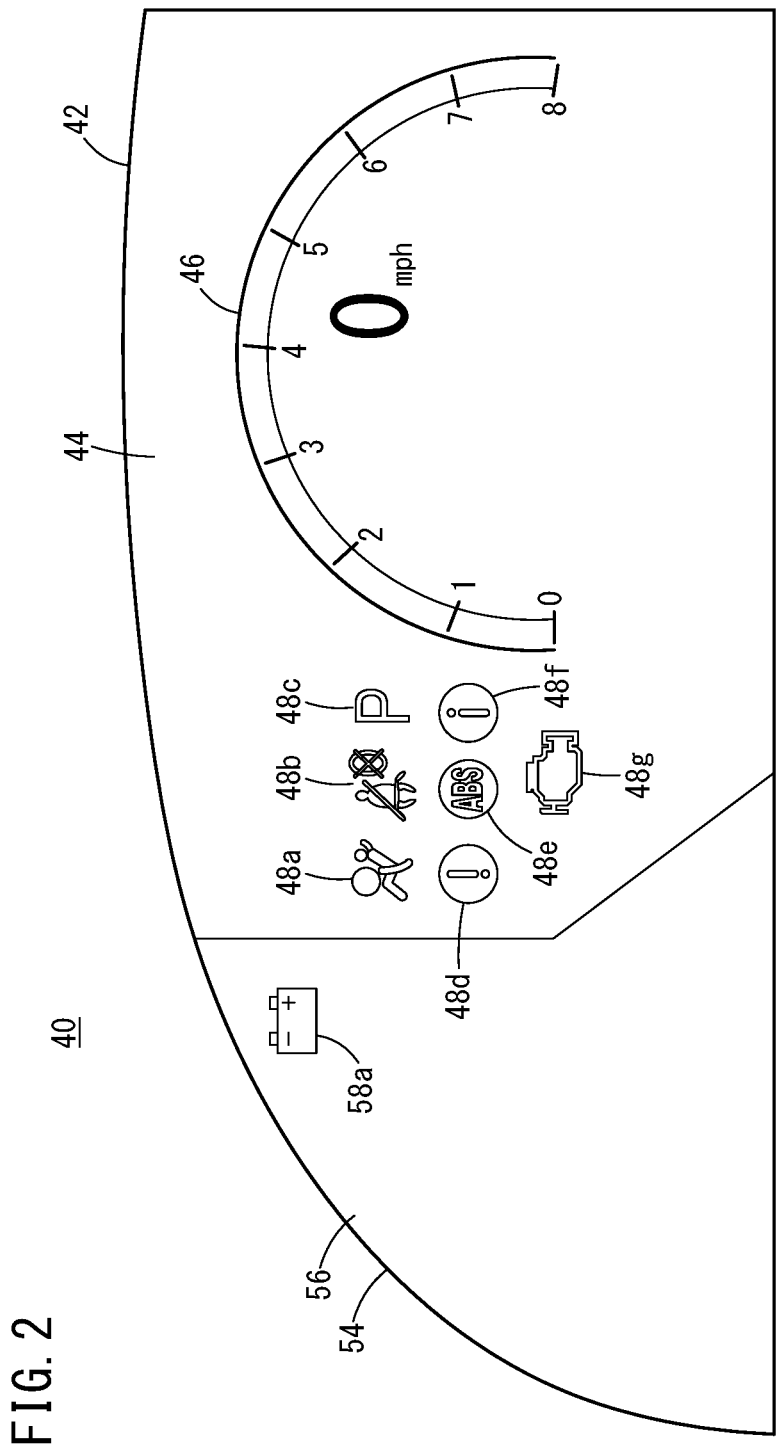
FIG. 2 is a schematic view of a meter panel.

As shown in FIG. 2, the first display section 44 of the first display 42 displays the meter display item 46 and the first lamp display item 48 (48a-48g). The meter display item 46, in addition to including a speedometer and a tachometer as shown in FIG. 2, may include the likes of an odometer, a trip meter, a water temperature gauge, and a fuel gauge. The meter display item 46 is always displayed while a power supply of the vehicle is set to an ON state.

The first lamp display item 48 includes various kinds of warning lights and display lights. Here, it includes the likes of a front airbag system warning light 48a, a side airbag system warning light 48b, a shift range display light 48c, a brake warning light 48d, an ABS warning light 48e, an information display light 48f, and a prime mover system warning light 48g. The first lamp display item 48 may include another warning light or display light. Each of the warning lights is displayed (lit up) when an abnormality is occurring in a system corresponding to that warning light, and is non-displayed (extinguished) when an abnormality is not occurring in the system corresponding to that warning light. The shift range display light 48c has its display switched according to a shift range set at that time point. The information display light 48f is displayed when there is information to be provided to the occupant.

The five warning lights included in the first lamp display item 48, that is, the front airbag system warning light 48a, the side airbag system warning light 48b, the brake warning light 48d, the ABS warning light 48e, and the prime mover system warning light 48g, are of high importance. Therefore, in the present embodiment, they are displayed in a state of being easily visually recognized by the occupant.

The second display section 56 of the second display 54 displays the second lamp display item 58. The second lamp display item 58 includes various kinds of warning lights and display lights. In addition to it here including a charge warning light 58a as shown in FIG. 2, it may include a warning light or display light not displayed in the first display section 44, such as an oil temperature warning light, a residual fuel amount warning light, a high water temperature warning light, a 'lights-on' display light, and a direction indicator display light. Moreover, the second display section 56 may display a meter display item 46 that differs from the meter display item 46 displayed in the first display 42. Similarly to in the first lamp display item 48, each of the warning lights of the second lamp display item 58 is displayed (lit up) when an abnormality is occurring in a system corresponding to that warning light, and is non-displayed (extinguished) when an abnormality is not occurring in the system corresponding to that warning light. The warning lights included in the second lamp display item 58 are of lower importance compared to the five warning lights included in the first lamp display item 48.

2. Operation

The processing performed by the meter display device 10 will be described using FIG. 3. The processing described below is repeatedly executed while the power supply of the vehicle is set to an ON state.

In step S1, the meter ECU 30 determines an ON-OFF state of the light switch 12, and determines the illuminance based on a detection signal outputted from the optical sensor 14. In the case that the light switch 12 is in an OFF state and the illuminance is higher than a threshold value (step S1: YES), that is, in the case that a periphery is bright, the processing shifts to step S2. On the other hand, in the case that the light switch 12 is in an ON state or the illuminance is less than or equal to the threshold value (step S1: NO), that is, in the case that the periphery is dark, the processing shifts to step S4.

Upon shifting to step S2 from step S1, the meter ECU 30 outputs to the meter panel 40 a display signal based on the detection signal of the vehicle sensor 16 and the abnormality occurrence signal of each of the ECUs 22, 24, 26. At this time, the meter ECU 30 outputs a display signal causing the meter display item 46 to be displayed in a first display color. Simultaneously, in step S3, the meter ECU 30 outputs a command signal setting the first backlight 52 to a high luminance (a certain luminance).

Figure 4:
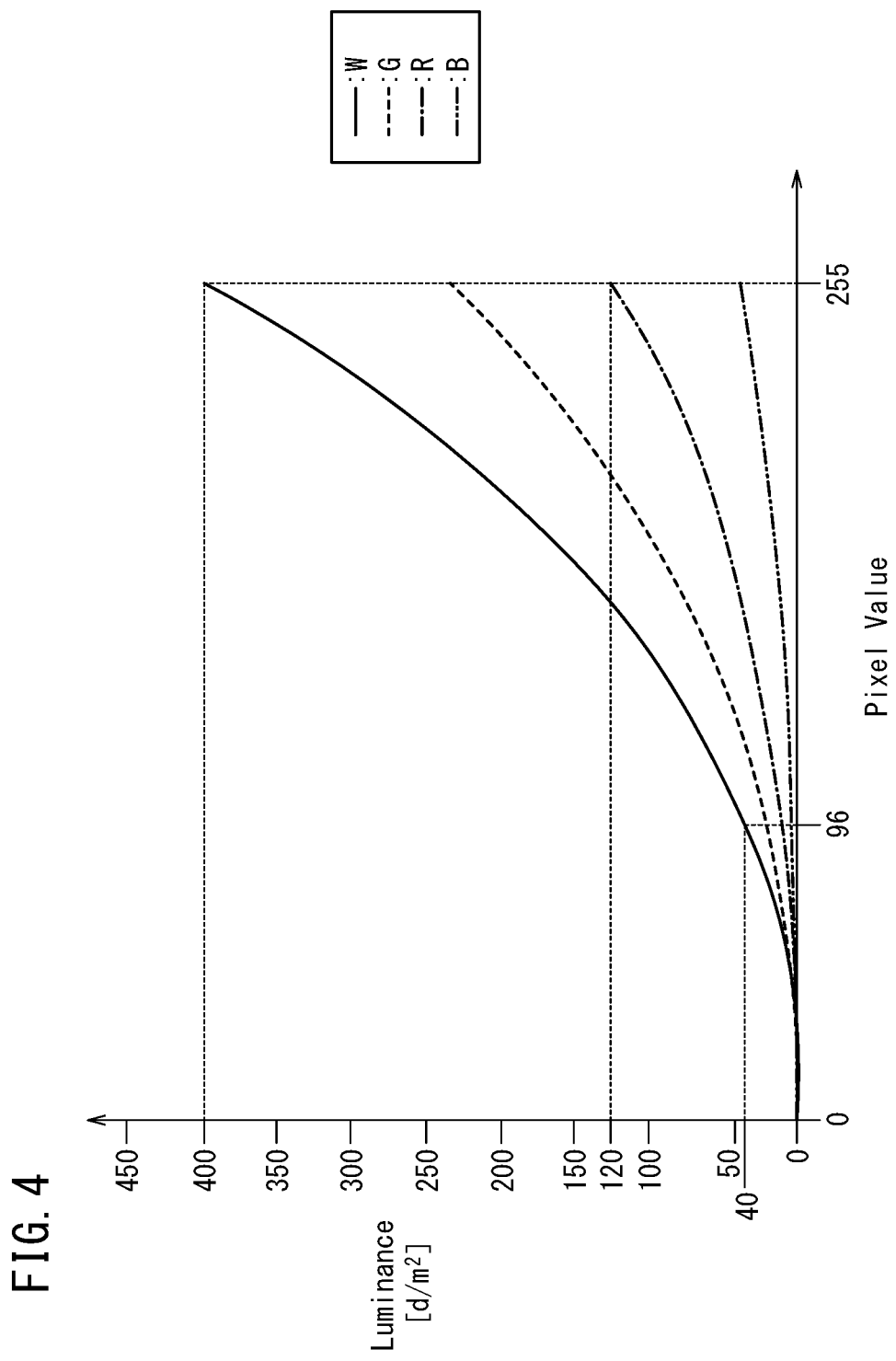
FIG. 4 is a view showing a relationship of a pixel value of each of pixels and a luminance.

Each of the first TFTs 50 operates according to the display signal, and the first backlight 52 operates according to the command signal. Thereupon, the meter display item 46 is displayed in the first display color in the first display section 44. In the first display color, each of elements (R, G, B) is set to a certain pixel value. For example, the pixel values for R, G, B of a part or all of the meter display item 46 are each set to 255. If the first backlight 52 is high luminance, then, as shown in FIG. 4, the luminance of a part or all of the meter display item 46 will be 400 cd/m$^2$, and its color will be white (255, 255, 255). Note that when displaying the first lamp display item 48 in the first display section 44, the first TFT 50 displays in a certain display color, here, red. In this case, the pixel value for R of the first lamp display item 48 is set to 255, and its pixel values for G and B are each set to 0. As shown in FIG. 4, if the first backlight 52 is high luminance, then the luminance of the first lamp display item 48 will be 120 cd/m$^2$. Note that if a portion of a color different from white is included in the meter display item 46, then R, G, B of that portion are also set to preset pixel values.

Upon shifting to step S4 from step S1, the meter ECU 30 determines whether or not there is an abnormality in each of systems of the vehicle. In the case that the meter ECU 30 is not receiving the abnormality occurrence signal from any of the ECUs 22, 24, 26 (step S4: YES), the processing shifts to step S5. On the other hand, in the case that the meter ECU 30 is receiving the abnormality occurrence signal from at least one of the ECUs 22, 24, 26 (step S4: NO), the processing shifts to step S7.

Upon shifting to step S5 from step S4, the meter ECU 30 outputs to the meter panel 40 a display signal based on the detection signal of the vehicle sensor 16. At this time, the meter ECU 30 outputs a display signal causing the meter display item 46 to be displayed in the first display color, similarly to when the periphery is bright. Simultaneously, in step S6, the meter ECU 30 outputs a command signal setting the first backlight 52 to a low luminance (a reduced illumination, dimming). In this case, the pixel values for R, G, B of a part or all of the meter display item 46 are each set to 255, and its luminance is set to about 40 cd/m$^2$. A reduced illumination amount is preset. At this time, the display color of a part or all of the meter display item 46 that was white at a time of high luminance, will be gray.

Upon shifting to step S7 from step S4, the meter ECU 30 outputs to the meter panel 40 a display signal based on the detection signal of the vehicle sensor 16 and the abnormality occurrence signal of each of the ECUs 22, 24, 26. At this time, the meter ECU 30 outputs a display signal causing the meter display item 46 to be displayed in a second display color. Simultaneously, in step S8, the meter ECU 30 outputs a command signal setting the first backlight 52 to a high luminance (a certain luminance).

Each of the first TFTs 50 operates according to the display signal, and the first backlight 52 operates according to the command signal. Thereupon, the meter display item 46 is displayed in the second display color in the first display section 44. The second display color is a display color in which a luminance level of the first display color has been lowered, and has R, G, B set to a certain pixel value. For example, the pixel values for R, G, B of a part or all of the meter display item 46 are each set to 96. In other words, each of pixel values for R, G, B is lowered in the same ratio (=96/255), compared to in the first display color. If the first backlight 52 is high luminance, then, as shown in FIG. 4, the luminance of a part or all of the meter display item 46 will be 40 cd/m$^2$, and its color will be gray (96, 96, 96). The pixel value for gray is preset to resemble the display color of the meter display item 46 at a time of low luminance Moreover, the first TFT 50 displays the first lamp display item 48 in the first display section 44 in a certain display color, here, red, similarly to when the periphery is bright. In this case, the pixel value for R of the first lamp display item 48 is set to 255, and its pixel values for G and B are each set to 0. As shown in FIG. 4, if the first backlight 52 is high luminance, then the luminance of the first lamp display item 48 will be 120 cd/m$^2$. Note that if a portion of a different color is included in the meter display item 46, then R, G, B of that portion are also corrected in the same ratio (=96/255). At this time, a look-up table (LUT), for example, is used.

Figure 3:
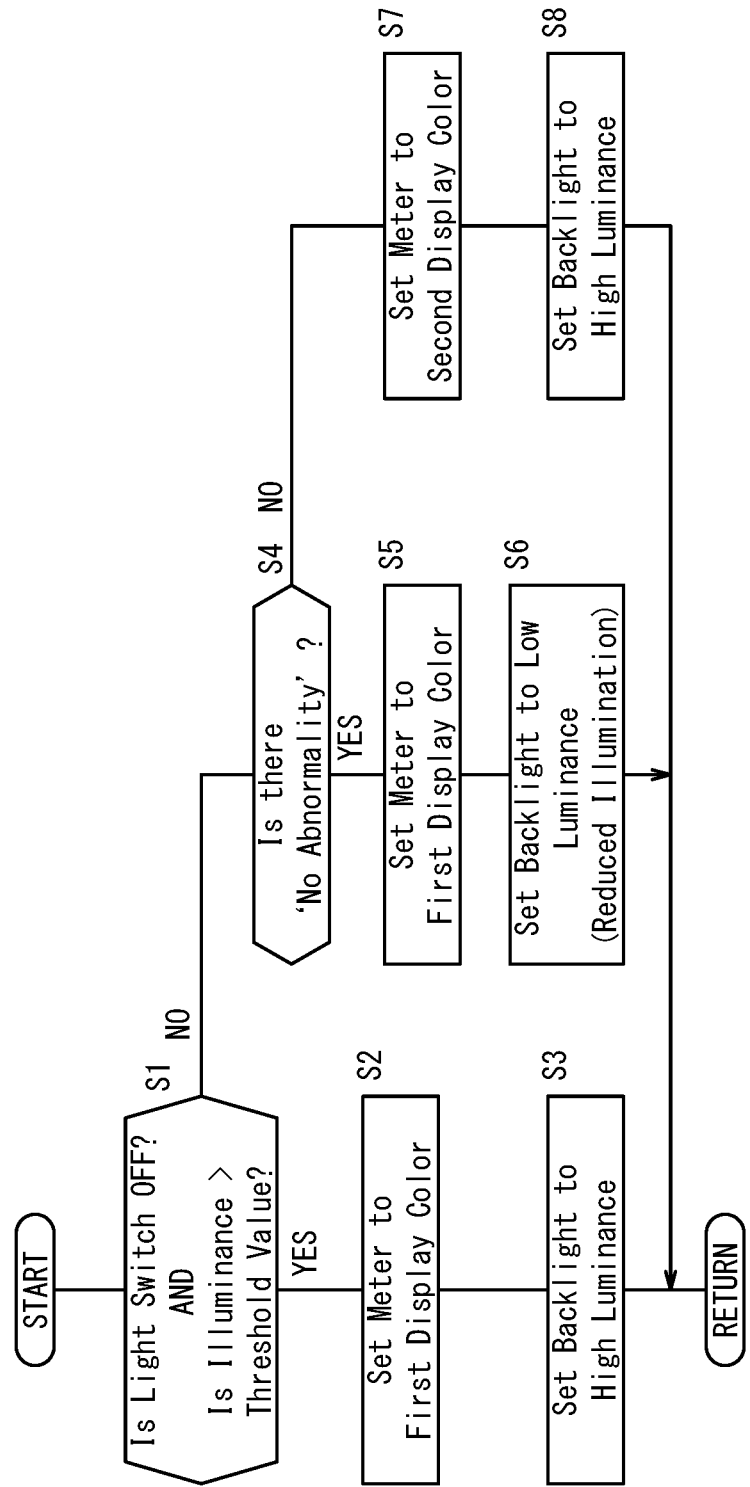
FIG. 3 is a flowchart of a processing performed by the meter display device according to the present embodiment.

The processing shown in FIG. 3 is a display processing of the first display 42. In contrast, in a display processing of the second display 54, the display color of the second lamp display item 58 and the luminance of the second backlight 62 may be made the same or may be made different, between when the periphery is bright and when it is dark.

Note that in the present embodiment, in step S1, the meter ECU 30 determines the ON-OFF state of the light switch 12, and determines the illuminance based on the detection signal outputted from the optical sensor 14. Instead, a configuration may be adopted whereby the meter ECU 30 determines either one of the ON-OFF state of the light switch 12 and the illuminance.

Moreover, the present embodiment sets each of the pixel values for R, G, B to 255 when a part or all of the meter display item 46 is displayed in the first display color, and sets each of the pixel values for R, G, B to 96 when a part or all of the meter display item 46 is displayed in the second display color. The first display color and the second display color are not limited to this. In other words, it is only required that each of the pixel values for R, G, B of the second display color is made smaller than each of the pixel values for R, G, B of the first display color, and that the ratio of R, G, B of the first display color and the ratio of R, G, B of the second display color are made the same.

3. Modified Examples

In the above-mentioned embodiment, the meter ECU 30, in the case where the periphery is dark and the first lamp display item 48 is displayed in the first display 42, sets the first backlight 52 to high luminance, and sets the display color of the meter display item 46 to the second display color. A configuration may be adopted to adjust the luminance of the first backlight 52 at this time.

For example, in the case where the luminance of the first backlight 52 is higher than the luminance of the second backlight 62 and the first lamp display item 48 and second lamp display item 58 are both displayed, adjustment (reduced illumination) may be performed such that the luminance of the first lamp display item 48 and the luminance of the second lamp display item 58 will be the same. On this occasion, the meter ECU 30 controls so as to match the luminance of the first backlight 52 to the luminance of the second backlight 62.

Moreover, the second display 54 may be a display utilizing an LED, or the like, rather than the display using a liquid crystal.

4. Summary of Embodiment

The meter display device 10 includes: the first display 42 that utilizes a liquid crystal to display the meter display item 46 and the first lamp display item 48, the meter display item 46 indicating a meter of the vehicle, and the first lamp display item 48 indicating by a displayed state or a non-displayed state a state of the vehicle; the meter ECU 30 that controls the first display 42; and the optical sensor 14 that detects the illuminance of the outside or the interior of the vehicle. The meter ECU 30 changes the display color of the meter display item 46 without changing the luminance of the first backlight 52 of the first display 42 and the display color of the first lamp display item 48, between when the illuminance is higher than a certain threshold value (step S2, step S3) and when the illuminance is lower than the certain threshold value (step S7, step S8).

In the above-described configuration, the luminance of the first backlight 52 of the first display 42 is not changed, regardless of the illuminance of the outside or the interior of the vehicle. Therefore, a luminance required to visually recognize the first lamp display item 48 is always maintained. Hence, the first lamp display item 48 can be made easy to see. On the other hand, in the above-described configuration, the display color of the meter display item 46 is changed according to the illuminance. At this time, it is possible to set to a display color that enables dazzling to be suppressed. Thus, due to the above-described configuration, each of the display items can be made easy to see while dazzling is suppressed, even when the illuminance of the outside or the interior of the vehicle is low.

Moreover, the meter ECU 30 increases the pixel value of the meter display item 46 when the illuminance is higher than a certain threshold value, and reduces the pixel value of the meter display item 46 when the illuminance is lower than the certain threshold value. Due to the above-described configuration, the pixel value of the meter display item 46 is reduced when the illuminance is low, hence dazzling can be suppressed.

In addition, the first lamp display item 48 is a warning light (the front airbag system warning light 48a, the side airbag system warning light 48b, the brake warning light 48d, the ABS warning light 48e, the prime mover system warning light 48g) that indicates by a displayed state an abnormality of the vehicle. The meter ECU 30, in the case where an abnormality is occurring in the vehicle, changes the display color of the meter display item 46 without changing the luminance of the first backlight 52 and the display color of the warning light (48*a*, 48*b*, 48*d*, 48*e*, 48*g*), between when the illuminance is higher than a certain threshold value and when the illuminance is lower than the certain threshold value. Moreover, the meter ECU 30, in the case where an abnormality is not occurring in the vehicle, changes the luminance of the first backlight 52 without changing the display color of the meter display item 46, between when the illuminance is higher than a certain threshold value and when the illuminance is lower than the certain threshold value. Due to the above-described configuration, when an abnormality is not occurring, the luminance of the first backlight 52 can be lowered. Therefore, a consumed amount of electric power can be reduced.

Moreover, the meter ECU 30 sets the display color of the warning light (48*a*, 48*b*, 48*d*, 48*e*, 48*g*) to red (255, 0, 0). Due to the above-described configuration, the display color of the warning light (48*a*, 48*b*, 48*d*, 48*e*, 48*g*) is set to red, hence a warning can be emphasized.

In addition, the meter ECU 30, in the case where an abnormality occurs in the vehicle and the illuminance is higher than a certain threshold value, sets the display color of the meter display item 46 to white (255, 255, 255), and in the case where an abnormality occurs in the vehicle and the illuminance is lower than the certain threshold value, sets the display color of the meter display item 46 to gray (96, 96, 96). Due to the above-described configuration, when the illuminance is high, the meter display item 46 can be made easy to see by setting the display color of the meter display item 46 to white. Moreover, when the illuminance is low, dazzling due to the meter display item 46 can be suppressed by setting the display color of the meter display item 46 to gray.

Viewed from another perspective, the meter display device 10 includes: the first display 42 that utilizes a liquid crystal to display the meter display item 46 and the first lamp display item 48, the meter display item 46 indicating a meter of the vehicle, and the first lamp display item 48 indicating by a displayed state or a non-displayed state a state of the vehicle; the second display 54 that displays the second lamp display item 58, the second lamp display item 58 indicating by a displayed state or a non-displayed state a state of the vehicle that differs from the state of the vehicle indicated by the first lamp display item 48; the meter ECU 30 that controls the first display 42 and the second display 54; and the optical sensor 14 that detects the illuminance of the outside or the interior of the vehicle. The first display 42 is capable of switching the luminance of the first backlight 52 between the high luminance and the low luminance, and is capable of displaying the meter display item 46 in the first display color or in the second display color a luminance level of which is smaller than that of the first display color. The meter ECU 30, in the case where the illuminance is lower than a certain threshold value (step S1: NO) and in the case where the first lamp display item 48 is set to the displayed state (step S4: NO), sets the luminance of the first backlight 52 to the high luminance (step S8) and sets the meter display item 46 to the second display color (step S7). Moreover, the meter ECU 30, in the case where the illuminance is lower than the certain threshold value (step S1: NO) and in the case where the first lamp display item 48 is set to the non-displayed state (step S4: YES), sets the luminance of the first backlight 52 to the low luminance (step S6).

In the above-described configuration, when the first lamp display item 48 is set to the displayed state, the first backlight 52 of the first display 42 is set to the high luminance. Therefore, a luminance required to visually recognize the first lamp display item 48 is always maintained. Hence, the first lamp display item 48 can be made easy to see. On the other hand, in the above-described configuration, when the illuminance is low and the first lamp display item 48 is set to a turned-off (lights-off) state, the luminance level of the display color of the meter display item 46 is reduced. Therefore, dazzling can be suppressed. Thus, due to the above-described configuration, each of the display items can be made easy to see while dazzling is suppressed, even when the illuminance of the outside or the interior of the vehicle is low.

Moreover, the meter ECU 30, when setting the luminance of the first backlight 52 to the low luminance and setting the first lamp display item 48 and the second lamp display item 58 to the displayed state, adjusts the luminance of the first backlight 52 such that the luminance of the first lamp display item 48 will be the same as the luminance of the second lamp display item 58. Due to the above-described configuration, a consumed amount of electric power can be further reduced.

Note that the meter display device according to the present invention is not limited to the above-mentioned embodiment, and that a variety of configurations may of course be adopted without departing from the spirit of the present invention.

What is claimed is:

1. A meter display device comprising:
a first display that utilizes a liquid crystal to display a meter display item and a first lamp display item, the meter display item indicating a meter of a vehicle, and the first lamp display item indicating by a displayed state or a non-displayed state a state of the vehicle;
a second display that displays a second lamp display item, the second lamp display item indicating by a displayed state or a non-displayed state a state of the vehicle that differs from the state of the vehicle indicated by the first lamp display item; and
a meter ECU that controls the first display and the second display,
the meter display device further comprising an optical sensor that detects an illuminance of an outside or an interior of the vehicle,
the first display being capable of switching a luminance of a backlight between a high luminance and a low luminance, and being capable of displaying the meter display item in a first display color or in a second display color a luminance level of which is smaller than that of the first display color, and
the meter ECU,
in the case where the illuminance is lower than a certain threshold value and in the case where the first lamp display item is set to the displayed state, sets the luminance of the backlight to the high luminance and sets the meter display item to the second display color, and
in the case where the illuminance is lower than the certain threshold value and in the case where the first lamp display item is set to the non-displayed state, sets the luminance of the backlight to the low luminance.

2. The meter display device according to claim 1, wherein the meter ECU,
when setting the luminance of the backlight to the low luminance and setting the first lamp display item and the second lamp display item to the displayed state, adjusts the luminance of the backlight such that a luminance of the first lamp display item will be the same as a luminance of the second lamp display item.

\* \* \* \* \*